United States Patent

[11] 3,571,595

[72] Inventor Gary L. Silver
Centerville, Ohio
[21] Appl. No. 816,237
[22] Filed Apr. 15, 1969
[45] Patented Mar. 23, 1971
[73] Assignee the United States of America as represented by the United States Atomic Energy Commission

[54] VARIABLE RATE NEUTRON SOURCE
6 Claims, 3 Drawing Figs.

[52] U.S. Cl. ................................................ 250/84.5
[51] Int. Cl. ................................................ G21g 3/04
[50] Field of Search ........................................ 250/84, 84.5; 176/(Inquired)

[56] References Cited
UNITED STATES PATENTS
3,260,847  7/1966  Amiel et al. ............... 250/84.5

Primary Examiner—James W. Lawrence
Assistant Examiner—Davis L. Willis
Attorney—Roland A. Anderson ABSTRACT: The present application comprises a variable rate neutron source including an alpha radiation source, a neutron emitting target material normally separated from said alpha source and means for cycling the target material between its separated location and contact with the alpha source.

PATENTED MAR 23 1971   3,571,595

INVENTOR.
GARY L. SILVER
BY

VARIABLE RATE NEUTRON SOURCE

BACKGROUND OF INVENTION

Neutron sources are commonly used in industry in a wide range of applications. Some of these applications include studies of the slowing down and diffusion of neutrons in various media, the determination of neutron scattering and absorption cross sections, calibration and comparison of neutron detectors and as primary and secondary standards in determining total neutron flux from various reactions. Most of these uses do not require a continuous high level of neutron flux. In the case of many prior neutron sources where the neutrons result from radiation bombardment of a target material from a radioactive material, the neutron flux cannot be decreased other than by expensive shielding and as such constitutes a potential hazard to personnel and increases costs associated with the shielding and more stringent safety procedures. Most of these neutron sources are capable of generating only a single level of neutron flux, which also results in a continuous depletion of target material and consequently shortened life of the neutron source.

It would be desirable to provide a neutron source in which the neutron flux could be decreased to a very low level or even shut off entirely. Further, it would be desirable if the level of neutron flux could be varied within the neutron source itself without use of external shielding, etc.

SUMMARY OF INVENTION

In view of the limitations of the prior art, it is an object of this invention to provide a novel variable rate neutron source.

It is another object of this invention to provide a neutron source which may emit neutrons at a plurality of flux levels.

It is a further object of this invention to provide a neutron source which may normally emit neutrons at a low flux level.

Various other objects and advantages will appear from the following description of one embodiment of the invention, and the most novel features will be particularly pointed out hereinafter in connection with the appended claims.

The present invention comprises an alpha source, a target material normally separated from the alpha source and means for cycling the target material between contact with the alpha source and its normal separated location.

DESCRIPTION OF DRAWING

The present invention is illustrated in the attached drawings wherein.

DETAILED DESCRIPTION

Figure 1:
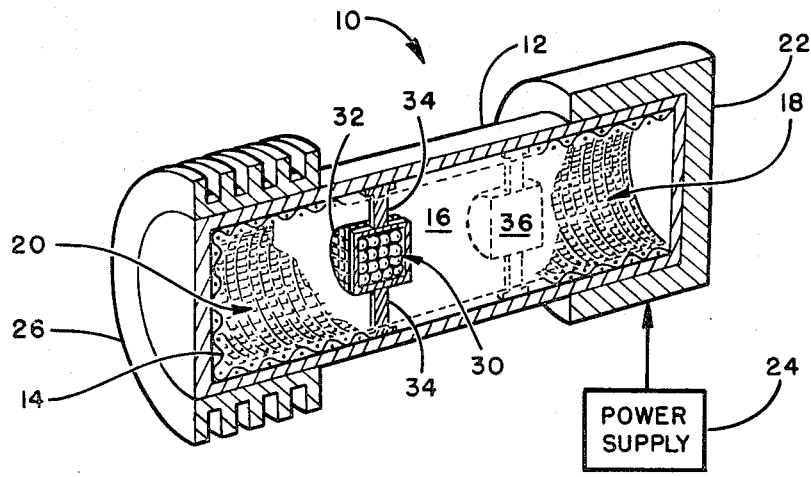
FIG. 1 is a cross-sectional, perspective view of an embodiment of this invention.

The present invention, as illustrated in FIG. 1, incorporates certain features of high efficiency, fluid transmission or transfer systems with an alpha radiation source to provide a variable rate neutron source 10. The fluid transfer portion of neutron source 10 may include an outer container or shell 12, a porous wick or capillary means 14 saturated with a suitable, dual-functioning condensable working fluid (not shown but described in detail below) and a central vapor transport passage or channel 16. Container 12 may have any desired shape or form, such as the tubular conduit or pipe shown, with any convenient cross section (constant or gradually increasing or decreasing) and length in either a straight or bent configuration, depending on the particular application. The wick is shown as a wire screen mesh but may be of any porous shape or material which will provide capillary movement of the working fluid, for example, woven cloth, fibrous glass, porous metal, porous ceramic tubes or narrow grooves cut lengthwise in the interior wall or surface of container 12. Container 12, as well as the wick 14, may be made of any suitable material, e.g. such as glass or steel, compatible with the operating conditions and environment and the particular working fluid used.

A fluid transfer system of this type utilizes a reflux-condensing or boiling-condensing thermal system together with capillary action to vaporize the working fluid in the high temperature zone or evaporator section 18 and condense the vapor in the low temperature zone or condenser section 20 of the heat pipe to drive or force the vaporized working fluid from the high temperature zone to the low temperature zone. This combined operation provides a cycling of the working fluid from zone 18 as a vapor through channel 16 and returning from zone 20 as a fluid through wick 14 to zone 18. The temperature along the entire length of a device is generally nearly isothermal with a temperature gradient generally of only a few degrees at the design temperature of the device depending on the boiling-condensing temperature of the working fluid and the working pressure. Zones 18 and 20 may be of any convenient length depending on the desired heat flux density.

The evaporator section 18 may be heated by any conventional heating means 22 such as an electrical resistance or the like heater powered by a conventional power supply 24 or some form of burner heating system. In some applications it may even be desirable by proper selection of a working fluid to eliminate heating means 22 and utilize some external heating source. Such a source could then be used as a heat-sensing device or if the neutron source is used near or with a system which inherently generates heat, for instance with a nuclear reactor, the system may supply the required heat.

Condenser section 20 may be coupled or associated with some suitable heat sink or exchange apparatus either directly through the walls of container 12 or through radiator fins 26 so as to dissipate excess heat to some appropriate medium like the atmosphere or a cooling medium.

The working fluid in this invention may include a target material, a mixture or compound of a target material and a diluent or carrier fluid or a mixture of target materials. The target material may be any appropriate material which readily undergoes an alpha, neutron reaction, e.g. fluorine. Other target materials which may be used include certain isotopes of oxygen, nitrogen and beryllium. Examples of working fluids containing fluorine which may be utilized include fluorobenzene, perfluorocarbon compounds (e.g. perfluoro-1, 3-dimethylcyclohexane (boiling point of 100° C.), tetrafluoromethane (also carbon tetrafluoride with a boiling point of 128° C), and perfluoropentane, and other conventional fluorocarbon compounds. The more highly fluorinated the compound, the more fluorine atoms available as a target for each molecule of the working fluid. If it is desired, a mixture of two or more fluids, each fluid having a different level of fluorination and different vapor pressure, may be used to provide a neutron source having an even greater variation of neutron flux levels.

It has been found that the variation in neutron flux level of the present invention may be provided by bringing the working fluid (containing target material) into contact or association with a source of alpha radiation when the working fluid is in the vapor phase and by retaining or containing the alpha source somewhat remote or away from the liquid phase of the working fluid. This dual functioning may be achieved by positioning a suitable alpha emitter material 30 within channel 16 separate from wick 14 in some appropriate manner. The alpha emitter or source material 30 may be in any conventional form, however, since the target material is primarily in its vapor phase during the alpha, neutron reaction, it may be preferable that alpha source material 30 be in some type of particulate or the like form. The particulate source material may be in the form of a powder or a more conveniently contained agglomerated form such as in microspheres or pellets, as shown.

The alpha source material may be any alpha radioactive material, preferably one that does not require extensive shielding from other forms of radiation. The source material may be in either the pure form or as oxides or ceramics. Some alpha source materials which may be used include plutonium 238, polonium 210, thorium 228, uranium 232 and americium 241.

Alpha source material 30 may be contained within an appropriate porous screen, sieve or cage 32 and positioned or held generally centrally within channel 16 by suitable supports 34. Cage 32 may be made in an elongated fashion so as to extend over a large portion or the complete length of channel 16 to increase the achievable neutron flux level or additional cages 36, shown by the dotted lines, may be positioned where and as desired.

Figure 2:
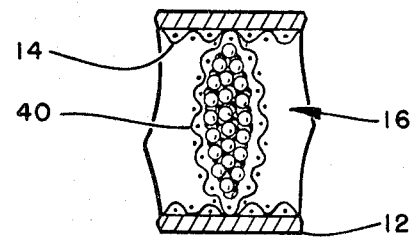
FIG. 2 is a fragmentary view of a modified version of FIG. 1.

FIG. 2 illustrates a modified form of wire cage or screen 40 which may be used in place of cages 32 or 36. Screen 40 may be in a generally clamshell-like configuration.

The cages or screens may be made of any appropriate material which is compatible with the environment such as stainless steel, and which will not unnecessarily block or impede the flow of vapor through the cage to the alpha source.

In operation, when the evaporator section 18 is heated, such as by heater 22, the working fluid (containing fluorine) may be vaporized and transported along channel 16 to condenser section 20 to effect target material cycling. As the working fluid vapor passes through and around cage 32, and consequently source material 30, alpha, neutron reactions may occur and neutrons are emitted from source 10. As the temperature of section 18 increases, increased vaporization will occur until some balanced level is reached and thus increase the neutron flux level. Additional range of neutron flux levels may be achieved by using a mixture of target materials having different vaporization pressures as noted above. When section 18 is removed from a supply of heat or heater 22 turned off, the working fluid may return completely or substantially to the liquid state and thus separate alpha source material 30 from the target material and minimize or stop any alpha, neutron reactions and return the neutron flux level to the neutron source's 10 inactive level near or at zero.

It will be apparent that neutron source 10 may be provided with appropriate apparatus (not shown) to permit removal and replacement of spent target and source material as required.

Figure 3:
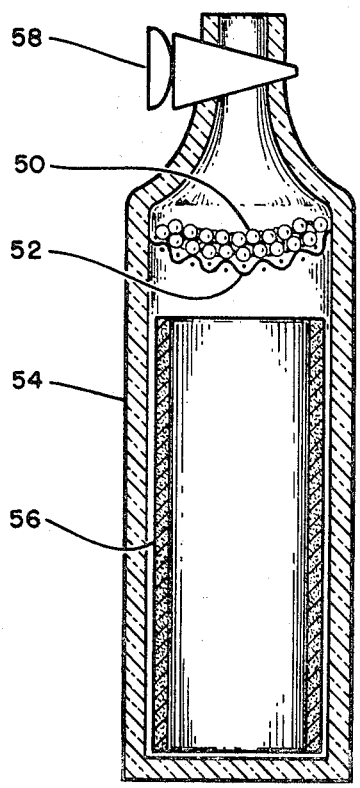
FIG. 3 is a cross-sectional view of another embodiment of this invention.

In the neutron source embodiment of FIG. 3, an alpha emitter material 50 may be disposed in and supported by a wire mesh or screen 52 suitably mounted in the interior of a bottle or container 54. An appropriate wick 56 suitably filled or saturated with a working fluid may be positioned along the interior wall of container 54 adjacent to or near screen 52, as shown. Wick 56, which may be of any convenient length, may be filled and material 50 disposed on screen 52 through a valve or stopper 58 in the neck or open end of container 54, as desired or needed. With the neutron source assembled as described, the lower end of the container may be heated to effect vaporization of the working fluid and initiation of alpha, neutron reactions as described above with respect to FIG. 1. Where a working fluid is used having a high vapor pressure and where the temperature environment about the neutron source is sufficiently high to vaporize the working fluid, the desired control of neutron flux may be achieved by controlled cooling of container 54. Where there is a sufficient density or volume of alpha radiation emitter material, the material itself may contribute to or constitute the source of heat for vaporizing working fluid.

There may be applications where it may be desirable to eliminate wick 56 and distribute the working fluid along the bottom or any other convenient portion of container 54. In this type of source, vapor may be brought into contact with alpha emitter material 50 by heating the working fluid through container 54 or in any other manner to the fluid-vaporizing temperature. The vaporized working fluid (containing target material) may then be distributed by convection conduction or the like throughout the container 54 and into contact with material 50. It will be readily apparent that such an arrangement may not permit the cycling described above with respect to FIG. 1 of target material into contact with alpha emitter material together with the replenishment of target material during operation of the neutron source.

A neutron source similar to that shown in FIGS. 1 and 3 may be operated with about 25 grams of plutonium 238 dioxide microspheres as an alpha source material and fluorobenzene as a working fluid and target material. The container may be made of glass about 1.5 inches inside diameter and about 10 inches long with a wick formed from glass wool rolled and pressed between a pair of stainless steel screens. With an increase in temperature of about 90° C, from a starting temperature, neutron emission may increase about 10 percent from the inactive or storage condition or state.

The neutron source of this invention may thus be safely handled without extensive radiation shielding or safety procedures when in the inactive condition while being capable of generating one or more levels of neutron flux. These levels of neutron flux may be readily controlled and selected by proper use of the container and cycling mechanism and/or by proper selection of working fluids and target materials.

It will be understood that various changes in the details, materials and arrangements of the parts, which have been herein described and illustrated in order to explain the nature of the invention, may be made by those skilled in the art within the principles and scope of the invention as expressed in the appended claims.

I claim:

1. A variable rate neutron source comprising, a source of alpha radiation, a normally liquid neutron emitting target material retained at a first location normally away from said alpha radiation source to minimize neutron emission, heating means for vaporizing said liquid target material, housing means containing said radiation source and target material to transfer said vaporized target material from said first location into contact with said alpha radiation source, cooling means for condensing said vaporized target material back to said liquid target material after said contact, and wick means within said housing spaced apart from said radiation source and extending between said first location and said condensing means for retaining said liquid target material and for transferring condensed liquid target material back to said first location for further cycling thereof.

2. The neutron source of claim 1 wherein said target material is a fluorine compound.

3. The neutron source of claim 2 wherein said target material is a mixture of fluorine compounds.

4. The neutron source of claim 2 wherein said target material is fluorobenzene.

5. The neutron source of claim 1 wherein said alpha radiation source includes plutonium 238.

6. A neutron source comprising a source of alpha radiation, a normally liquid neutron emitting target material in a first location spaced apart from said alpha radiation source, heating means for vaporizing said liquid target material, and means for conveying resulting vapor from said first location into contact with said alpha radiation source.